United States Patent [19]

Hoffman et al.

[11] 4,329,231

[45] May 11, 1982

[54] INSULATING FUEL FILTER COVER

[75] Inventors: Edward L. Hoffman; David L. Mitton, both of Forest Lake, Minn.

[73] Assignee: Mitthoff Corporation, Forest Lake, Minn.

[21] Appl. No.: 80,341

[22] Filed: Oct. 1, 1979

[51] Int. Cl.³ ............... B01D 23/00; B01D 25/00; B01D 27/00; B01D 29/00
[52] U.S. Cl. .................. 210/416.4; 29/450; 55/267; 138/32; 123/198 R; 123/196 A; 210/DIG. 11; 220/3.1
[58] Field of Search ............. 29/450, 455 R, 156.4 R; 55/267; 210/416.4, DIG. 11, 446–448, DIG. 17, 323.2, 541, 542, 443, 444, 440; 123/41.5, 180 R, 196 A, 1 R, 1 A, 142.5 R, 142.5 E, 557, 179 G, 198 R, 198 E; 220/3.1, 410–412; 150/52 R; 138/32, 147; 264/48

[56] References Cited

U.S. PATENT DOCUMENTS

| | | |
|---|---|---|
| 2,371,347 | 3/1945 | Morrow . |
| 3,272,337 | 9/1966 | Elwell ........................ 210/448 X |
| 3,285,455 | 11/1966 | Pewitt ........................ 220/410 X |
| 3,294,240 | 12/1966 | Korte ........................ 210/416.4 X |
| 3,319,328 | 5/1967 | Finger et al. ............... 29/450 X |
| 3,344,925 | 10/1967 | Graham ....................... 220/410 X |
| 3,374,298 | 3/1968 | Studen ........................ 220/410 X |
| 3,775,350 | 11/1973 | Juhas et al. ................. 264/48 X |
| 3,846,526 | 11/1974 | Wade ........................... 264/48 X |
| 3,906,129 | 9/1975 | Damois ....................... 150/52 R X |
| 3,941,159 | 3/1976 | Toll ............................ 138/147 |
| 4,114,759 | 9/1978 | Maloney, Jr. ................. 220/410 X |
| 4,230,142 | 10/1980 | Saarem et al. ............... 137/375 X |

Primary Examiner—Charlie T. Moon
Attorney, Agent, or Firm—Kinney, Lange, Braddock, Westman and Fairbairn

[57] ABSTRACT

A thermally insulating fuel filter cover provides thermal insulation of the fuel filter of a diesel engine such as is used in the trucking industry. The cover is a flexible cylindrical body of thermal insulating material such as expandable urethane foam which has a closed end, an open end, and a hollow interior portion for receiving the fuel filter. The cover is slidable over the fuel filter and is flexible so as to form a friction fit. The cover encloses the exposed surfaces of the fuel filter and provides thermal insulation to help prevent waxing and freeze-up of the fuel in the fuel filter in cold weather.

5 Claims, 6 Drawing Figures

INSULATING FUEL FILTER COVER

BACKGROUND OF THE INVENTION

1. Field of the Invention.

The present invention is concerned with a device for insulating a fuel filter on an internal combustion engine, such as a diesel engine.

2. Description of the Prior Art.

Diesel engines have found wide use in many applications, particularly in providing power for heavy construction equipment and large trucks. In cold climates, such as the northern United States and Canada during the winter months, operation of diesel engines is more difficult. While substantial improvements have been made to improve the performance of diesel engines in cold climates, further improvements are desirable.

One area of particular difficulty in the operation of diesel powered trucks in northern climates has been the waxing or freezing up of fuel in the fuel filter of diesel engines. This results in the fuel supply to the engine being cut off.

One prior art attempt to reduce the fuel waxing and freeze-up problem is marketed by Mack Trucks, Inc. This product is a canvas bag with insulating material inside which is slipped over the fuel filter and then tied in place. This product, however, has serious disadvantages. First, wind can blow through the canvas, thereby allowing heat to escape and cold air to get in. This significantly decreases the effectiveness of the product. Second, the canvas tends to soak up gasoline, grease and the like. Third, the canvas is flammable, and therefore presents a fire hazard.

SUMMARY OF THE INVENTION

The present invention is a thermally insulating fuel filter cover which is slidably mounted over the fuel filter of an internal combustion engine such as a diesel engine to help prevent waxing and freeze-up of the fuel in the fuel filter in cold climates. The thermally insulating fuel filter cover comprises a cylindrical body of thermal insulation material, such as urethane foam or other flexible, lightweight, thermally insulating material. The cylindrical body has a closed end, an open end, and a hollow interior portion for receiving the fuel filter. The cover is slidable over the fuel filter to enclose the fuel filter and provide thermal insulation between the fuel filter and the surrounding environment.

DETAILED DESCRIPTION OF THE PREFERRED EMBODIMENTS

Figure 1A:
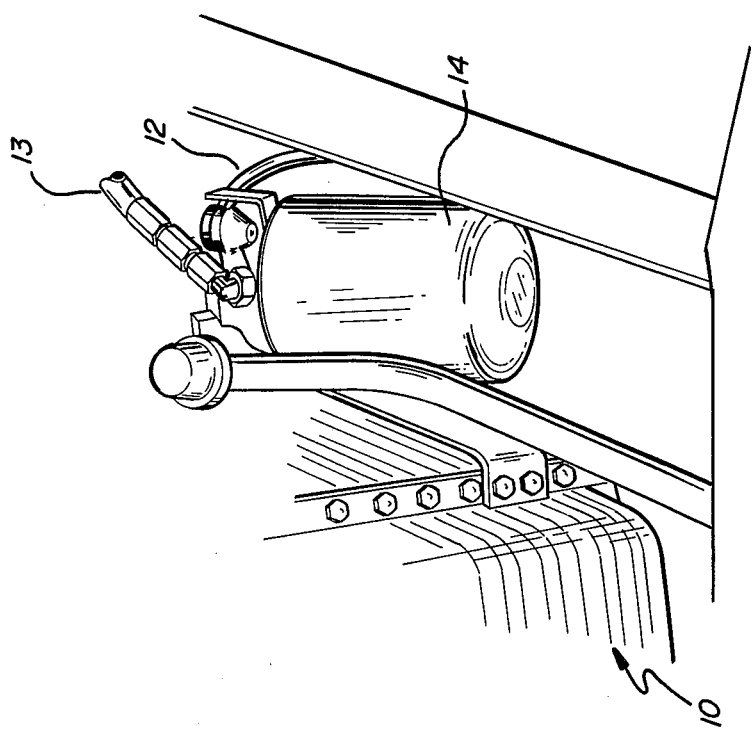
FIGS. 1A and 1B are a perspective view of a diesel engine having a fuel filter and showing the fuel filter cover of the present invention.
Figure 1B:
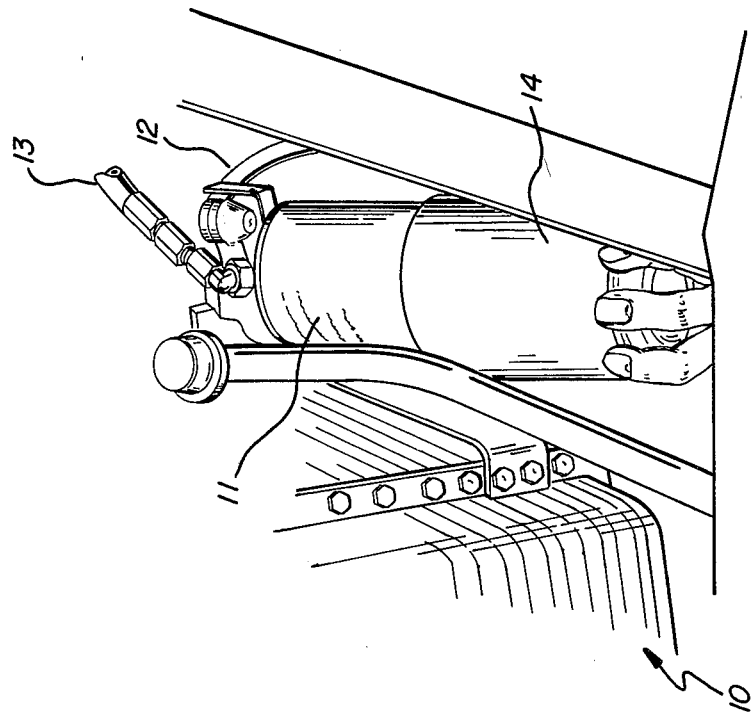
Figure 2:
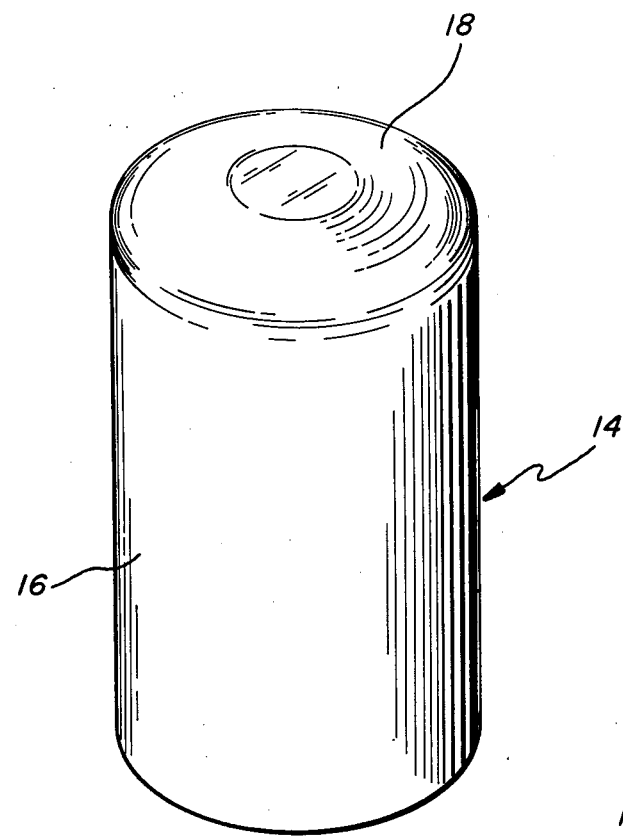
FIG. 2 is a perspective view of the fuel filter cover of the present invention.
Figure 3:
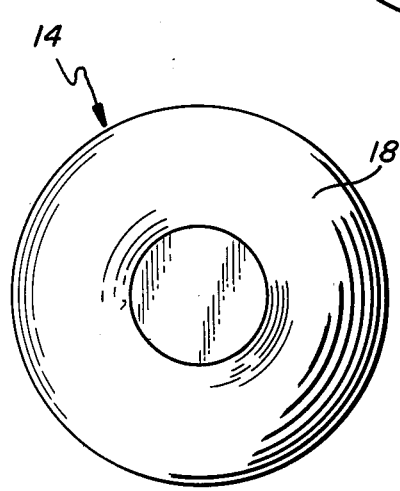
FIG. 3 is a view of the closed end of the fuel filter cover of the present invention.
Figure 4:
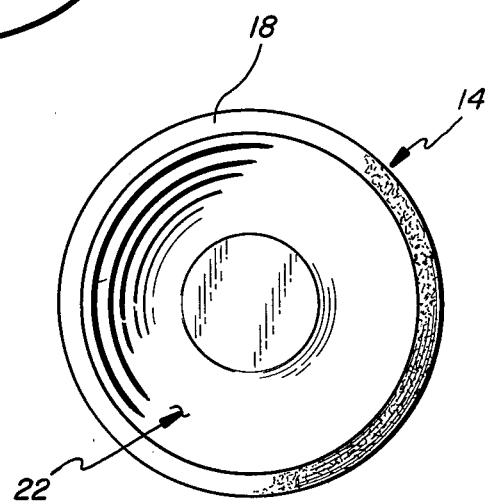
FIG. 4 is a view of the open end interior of the fuel filter cover of the present invention.
Figure 5:
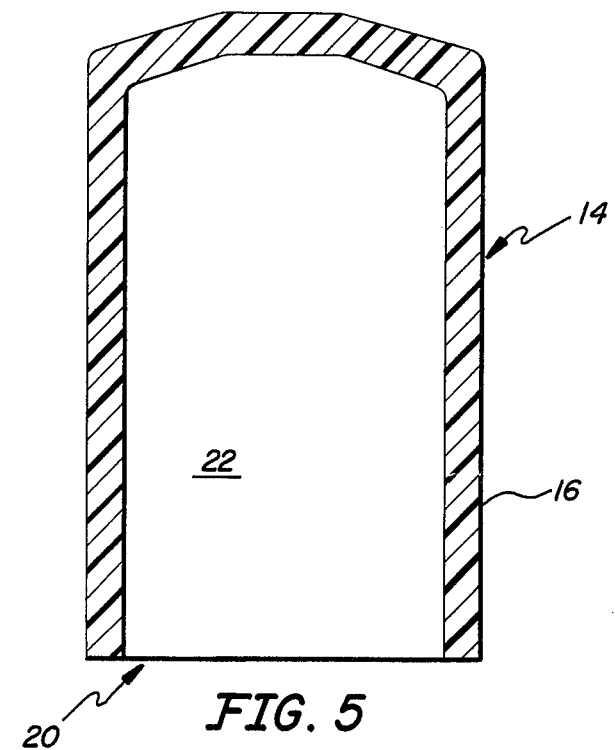
FIG. 5 is a sectional view along section 5—5 of FIG. 2.

FIGS. 1A and 1B are perspective views from below a typical diesel engine 10 having a fuel filter 11. Leading to fuel filter 11 is fuel line 12 from the fuel tank (not shown). Fuel line 13 leads from fuel filter 12 to the fuel system of engine 10. In FIG. 1A, fuel filter cover 14 of the present invention is shown as it is being installed on fuel filter 11. During installation, insulating cover 14 slides over fuel filter 12 and forms a friction fit so as to remain in place. In FIG. 1B, fuel filter cover 14 is shown in its installed position over fuel filter 12. Cover 14 encloses the side and bottom surfaces of fuel filter 12 and provides thermal insulation between fuel filter 12 and the surrounding environment.

FIGS. 2–5 shows fuel filter cover 14 in further detail. As illustrated in FIGS. 2–5, fuel filter cover 14 is a generally cylindrical shaped body of a flexible insulating material such as expandable urethane foam. The cover 14 has a generally cylindrical side wall 16, a dome-shaped closed end 18, and an open end 20. Interior portion 22 of cover 14 is hollow to slidably receive fuel filter 11. The length of fuel filter cover 14 and the inner diameter of portion 22 is selected to permit cover 14 to slide over fuel filter 11 and form a snug, friction fit. Once installed over fuel filter 11, therefore, cover 14 will not come loose during operation of engine 10.

In one preferred embodiment, the material forming cover 14 was an expandable urethane foam of approximately seven-pound density. The urethane foam is a low cost unitary molded material which provides the necessary insulating properties while being low in manufacturing cost. The inner diameter of cover 14 was approximately 3.650 inches, and the outer diameter was approximately 4.250 inches. The wall thickness of side wall 16 and closed end 18 was approximately 0.250 to 0.300 inches. The outside length from open end 20 to the exterior of closed end 18 was approximately 7.00 inches for one common size of fuel filter 11. For other common sizes of fuel filter 11, the length of cover 14 is different, while the other dimensions remain the same.

The insulating fuel filter cover 14 of the present invention helps prevent waxing and freeze-up of fuel in fuel filters used in diesel engines. Cover 14 is rapidly and easily installed over fuel filter 11 and remains securely in place due to the flexible material forming cover 14 and the inner diameter of portion 22 being essentially equal to the outer diameter of fuel filter 11 (within a few thousandths of an inch).

The urethane foam is a preferred material for cover 14 because it is a self-skinning foam material. In other words, when cover 14 is molded, the surfaces in contact with the mold form a generally smooth surface, while the interior portions are a cellular foam structure. As a result, the material forming cover 14 is essentially impervious to both moisture and wind. Not only does the impervious skin prevent cold air from passing through cover 14, but it also provides a barrier against oil and grease. Any oil, grease or dirt which accumulates on the outer surface of cover 14 may simply be wiped off.

The preferred density and thickness of the foam permits cover 14 to be flexible, while still having sufficient structural strength to permit sliding onto filter 11 without collapsing. In certain diesel powered trucks, the fuel filter is located in a position which is difficult to reach. The flexibility of the insulating cover 14, and the fact that no typing or other attachment is required, permits cover 14 to be installed onto fuel filter 11 even when fuel filter 11 is located in a difficult-to-reach place.

Still another important advantage of the preferred embodiment is that it is fire retardent. This presents significantly less risk of fire than does the prior art canvas bag device.

When replacement of fuel filter 11 becomes necessary, fuel filter cover 14 is easily removable to permit installation of a replacement fuel filter. Cover 14 may be reused numerous times, since it is merely slid on and off of fuel filter 11, and is not permanently affixed to fuel filter 11.

This is a particular advantage since many large diesel powered trucks are on a regular maintenance schedule in which fuel filters are changed approximately every 10,000–15,000 miles. The ability to easily and quickly install and remove the filter cover 14 of the present invention and to reuse the filter cover is highly desirable.

It is understood that the closed end 18 may have a small hole therein to permit escape and entry of a slight amount of air during installation and removal, respectively, of cover 14. This permits easier sliding on and off of cover 14, since it allows air to escape from between the end of fuel filter 11 and closed end 18 as cover 14 is slid onto the fuel filter 11. Similarly, it permits a slight amount of air to enter interior portion 12 between the end of fuel filter 11 and closed end 18 as cover 14 is being removed. During normal operation, with cover 14 in place over filter 11, the hole is so small that any heat loss which may occur through the hole is insignificant.

Although the present invention has been described with reference to preferred embodiments, workers skilled in the art will recognize that changes may be made in form and detail without departing from the spirit and scope of the invention.

What is claimed is:

1. The combination of a diesel internal combustion engine having a diesel fuel filter and a thermally insulating unitary, fuel filter cover, said cover comprising:
    a cylindrical body of flexible thermal insulating expanded foam material with a fire retardant characteristic having a closed end, an open end, and a hollow interior portion frictionally engaging and covering side surfaces and covering a bottom of the fuel filter and having sufficient structural strength to frictionally remain in place on the fuel filter without further fastening means to provide thermal insulation between the fuel filter and a surrounding enenvironment, said body of expanded foam material having a self-skinned molded exterior.

2. The invention of claim 1 wherein the fuel filter cover has a wall thickness of about 0.250 to 0.300 inches.

3. The invention of claim 2 wherein the flexible thermal insulation material is a urethane foam.

4. The invention of claim 3 wherein the urethane foam has an approximate seven-pound density.

5. The invention of claim 1 wherein the closed end of the fuel filter cover has a dome shape for conforming to an end of the fuel filter.

* * * * *